US009981288B2

(12) United States Patent
Song et al.

(10) Patent No.: US 9,981,288 B2
(45) Date of Patent: May 29, 2018

(54) PROCESS FOR MANUFACTURING RECORDING SHEET

(71) Applicant: INTERNATIONAL PAPER COMPANY, Memphis, TN (US)

(72) Inventors: Jay C. Song, Highland Mills, NY (US); Sen Yang, Nanuet, NY (US); Michelle X. Wang, Lititz, PA (US); Pat Morabito, Matamoras, PA (US)

(73) Assignee: INTERNATIONAL PAPER COMPANY, Memphis, TN (US)

( * ) Notice: Subject to any disclaimer, the term of this patent is extended or adjusted under 35 U.S.C. 154(b) by 0 days. days.

(21) Appl. No.: 14/993,126

(22) Filed: Jan. 12, 2016

(65) Prior Publication Data
US 2016/0124333 A1    May 5, 2016

Related U.S. Application Data

(62) Division of application No. 12/557,810, filed on Sep. 11, 2009, now Pat. No. 9,296,244.

(60) Provisional application No. 61/194,275, filed on Sep. 26, 2008.

(51) Int. Cl.
| | | |
|---|---|---|
| *B05D 7/00* | (2006.01) |
| *B41M 5/52* | (2006.01) |
| *B05D 1/36* | (2006.01) |
| *B05D 7/04* | (2006.01) |
| *C09D 125/14* | (2006.01) |
| *C09J 123/08* | (2006.01) |
| *C08K 3/34* | (2006.01) |
| *C08K 5/098* | (2006.01) |
| *C09D 11/107* | (2014.01) |
| *C09D 11/322* | (2014.01) |
| *G03G 9/09* | (2006.01) |
| *B41M 5/50* | (2006.01) |
| *C09D 133/02* | (2006.01) |
| *C09D 147/00* | (2006.01) |
| *C08L 3/02* | (2006.01) |
| *C08L 23/08* | (2006.01) |
| *C08L 29/04* | (2006.01) |
| *C08L 53/02* | (2006.01) |

(52) U.S. Cl.
CPC ............ *B05D 7/5483* (2013.01); *B05D 1/36* (2013.01); *B05D 7/04* (2013.01); *B41M 5/508* (2013.01); *B41M 5/52* (2013.01); *B41M 5/5218* (2013.01); *B41M 5/5227* (2013.01); *B41M 5/5254* (2013.01); *C08K 3/346* (2013.01); *C08K 5/098* (2013.01); *C09D 7/61* (2018.01); *C09D 11/107* (2013.01); *C09D 11/322* (2013.01); *C09D 125/14* (2013.01); *C09D 133/02* (2013.01); *C09D 147/00* (2013.01); *C09J 123/0869* (2013.01); *G03G 9/0902* (2013.01); *B05D 2201/02* (2013.01); *B05D 2203/22* (2013.01); *B41M 5/5263* (2013.01); *B41M 2205/42* (2013.01); *C08K 3/013* (2018.01); *C08L 3/02* (2013.01); *C08L 23/0869* (2013.01); *C08L 29/04* (2013.01); *C08L 53/02* (2013.01); *Y10T 428/24942* (2015.01); *Y10T 428/273* (2015.01)

(58) Field of Classification Search
CPC .... B41M 5/52; B41M 5/5218; B41M 5/5263; B41M 5/5254; C09D 7/1216; C09D 125/14; C09J 123/0869; C08L 29/04; C08L 23/0869; C08L 3/02; C08L 53/02; B05D 1/36; B05D 7/04; B05D 7/5483; B05D 2201/02; B05D 2203/22
USPC .......................................... 428/323; 427/411
See application file for complete search history.

(56) References Cited

U.S. PATENT DOCUMENTS

| | | |
|---|---|---|
| 2,628,918 A | 2/1953 | Wilson et al. |
| 2,684,300 A | 7/1954 | Wilson et al. |
| 3,582,464 A | 6/1971 | Aldrich |
| 3,615,972 A | 10/1971 | Morehouse, Jr. et al. |
| 3,644,258 A | 2/1972 | Moore et al. |
| 3,864,181 A | 2/1975 | Wolinski et al. |
| 3,872,039 A | 3/1975 | Vaughn et al. |
| 3,966,654 A | 6/1976 | Aldrich |
| 3,991,256 A | 11/1976 | Cornier et al. |
| 4,006,273 A | 2/1977 | Wolinski et al. |
| 4,017,431 A | 4/1977 | Aldrich |
| 4,022,965 A | 5/1977 | Goheen et al. |

(Continued)

FOREIGN PATENT DOCUMENTS

| | | |
|---|---|---|
| AU | 2003267281 | 4/2004 |
| EP | 0053018 | 6/1982 |

(Continued)

Primary Examiner — William P Fletcher, III
(74) Attorney, Agent, or Firm — Thomas W. Barnes, III

(57) ABSTRACT

A method for making a recording sheet is provided, the recording sheet comprising a sizing or coating composition, which comprises a first binder resin, which is compatible with dry toner binder resin; a second binder resin, which is compatible with liquid toner binder resin; a first pigment, which has a BET surface area of from greater than zero to about 35 m²/g or greater; a second pigment, which has a BET surface area of from greater than zero to about 35 m²/g or greater, and which is different from the first pigment; and a paper or plastic substrate in contact with the composition, wherein the sizing or coating composition is comprised within first and second sublayers, and said method for making the recording sheet comprising contacting, in any order: the first binder resin; the second binder resin; the first pigment; the second pigment; or a mixture thereof, and the paper or plastic substrate, to produce the recording sheet.

13 Claims, No Drawings

(56) References Cited

U.S. PATENT DOCUMENTS

| | | |
|---|---|---|
| 4,044,176 A | 8/1977 | Wolinski et al. |
| 4,075,136 A | 2/1978 | Schaper |
| 4,166,894 A | 9/1979 | Schaper |
| 4,174,417 A | 11/1979 | Rydell |
| 4,263,182 A | 4/1981 | Aldrich |
| 4,317,849 A | 3/1982 | Ogura et al. |
| 4,341,839 A | 7/1982 | Shaw et al. |
| 4,375,533 A | 3/1983 | Park et al. |
| 4,431,481 A | 2/1984 | Drach et al. |
| 4,446,174 A | 5/1984 | Maekawa et al. |
| 4,460,637 A | 7/1984 | Miyamoto et al. |
| 4,496,427 A | 1/1985 | Davison |
| 4,540,635 A | 9/1985 | Ronge et al. |
| 4,554,181 A | 11/1985 | Cousin et al. |
| 4,617,239 A | 10/1986 | Maruyama et al. |
| 4,714,603 A | 12/1987 | Vanderheiden |
| 4,722,943 A | 2/1988 | Melber et al. |
| 4,770,934 A | 9/1988 | Yamasaki et al. |
| 4,780,356 A | 10/1988 | Otouma et al. |
| 4,829,094 A | 5/1989 | Melber et al. |
| 4,835,212 A | 5/1989 | Degen et al. |
| 4,855,343 A | 8/1989 | Degen et al. |
| 4,888,092 A | 12/1989 | Prusas et al. |
| 4,892,787 A | 1/1990 | Kruse et al. |
| 4,908,240 A | 3/1990 | Auhorn et al. |
| 4,911,451 A | 3/1990 | Sullivan et al. |
| 4,970,119 A | 11/1990 | Koshizuka et al. |
| 4,986,882 A | 1/1991 | Mackey et al. |
| 5,017,416 A | 5/1991 | Imperial |
| 5,045,587 A | 9/1991 | Tanaka et al. |
| 5,049,235 A | 9/1991 | Barcus et al. |
| 5,053,268 A | 10/1991 | Ehara et al. |
| 5,061,346 A | 10/1991 | Taggart et al. |
| 5,124,201 A | 6/1992 | Kurabayashi et al. |
| 5,160,789 A | 11/1992 | Barcus et al. |
| 5,171,626 A | 12/1992 | Nagamine et al. |
| 5,201,944 A | 4/1993 | Nakata et al. |
| 5,209,953 A | 5/1993 | Grupe et al. |
| 5,219,610 A | 6/1993 | Koshizuka et al. |
| 5,266,250 A | 11/1993 | Kroyer |
| 5,266,383 A | 11/1993 | Sakaki et al. |
| 5,281,467 A | 1/1994 | Shimada et al. |
| 5,286,521 A | 2/1994 | Matsuda et al. |
| 5,302,249 A | 4/1994 | Malhotra et al. |
| 5,326,499 A | 7/1994 | Wegner et al. |
| 5,358,998 A | 10/1994 | Wendel et al. |
| 5,360,420 A | 11/1994 | Cook et al. |
| 5,362,558 A | 11/1994 | Sakaki et al. |
| 5,429,718 A | 7/1995 | Morlino et al. |
| 5,437,925 A | 8/1995 | Macaulay et al. |
| 5,443,899 A | 8/1995 | Barcus et al. |
| 5,508,108 A | 4/1996 | Tokiyoski et al. |
| 5,531,728 A | 7/1996 | Lash |
| 5,591,489 A | 1/1997 | Dragner et al. |
| 5,622,781 A | 4/1997 | Macaulay et al. |
| 5,629,376 A | 5/1997 | Sargent et al. |
| 5,662,773 A | 9/1997 | Frederick et al. |
| 5,667,637 A | 9/1997 | Jewell et al. |
| 5,674,664 A | 10/1997 | Tanikawa et al. |
| 5,685,815 A | 11/1997 | Bottorff et al. |
| 5,698,074 A | 12/1997 | Barcus et al. |
| 5,698,688 A | 12/1997 | Smith et al. |
| 400,170 A | 1/1998 | Wallajapet et al. |
| 5,709,976 A | 1/1998 | Malhotra |
| 5,714,270 A | 2/1998 | Malhotra et al. |
| 5,731,080 A | 3/1998 | Cousin et al. |
| 5,741,889 A | 4/1998 | Huang et al. |
| 5,856,001 A | 1/1999 | Okumura et al. |
| 5,919,558 A | 7/1999 | Chao |
| 6,048,439 A | 4/2000 | Huang et al. |
| 6,146,494 A | 11/2000 | Seger et al. |
| 6,146,648 A | 11/2000 | Bret et al. |
| 6,150,289 A | 11/2000 | Chen et al. |
| 6,165,320 A | 12/2000 | Bates et al. |
| 6,171,444 B1 | 1/2001 | Nigam |
| 6,197,383 B1 | 3/2001 | Nigam |
| 6,207,258 B1 | 3/2001 | Varnell |
| 6,241,787 B1 | 6/2001 | Nigam |
| 6,284,819 B1 | 9/2001 | Darsillo et al. |
| 6,355,448 B1 | 3/2002 | Foltz et al. |
| 6,361,651 B1 | 3/2002 | Sun |
| 6,379,497 B1 | 4/2002 | Sandstrom et al. |
| 6,414,055 B1 | 7/2002 | Lauzon |
| 6,426,381 B1 | 7/2002 | Konig et al. |
| 6,465,082 B1 | 10/2002 | Takezawa et al. |
| 6,471,824 B1 | 10/2002 | Jewell |
| 6,482,886 B1 | 11/2002 | Finiayson et al. |
| 6,485,139 B1 | 11/2002 | Lavery et al. |
| 6,506,282 B2 | 1/2003 | Hu et al. |
| 6,534,156 B1 | 3/2003 | Baker et al. |
| 6,534,157 B1 | 3/2003 | Baker et al. |
| 6,534,158 B2 | 3/2003 | Huang et al. |
| 6,565,708 B2 | 5/2003 | Ikeda et al. |
| 6,579,414 B2 | 6/2003 | Jewell |
| 6,579,415 B2 | 6/2003 | Jewell |
| 6,582,557 B2 | 6/2003 | Jewell |
| 6,592,712 B2 | 7/2003 | Koukoulas et al. |
| 6,592,717 B2 | 7/2003 | Jewell |
| 6,617,364 B2 | 9/2003 | Soane et al. |
| 6,632,488 B2 | 10/2003 | Okumura et al. |
| 6,686,054 B2 | 2/2004 | Nigam |
| 6,696,118 B2 | 2/2004 | Asaoka et al. |
| 6,761,977 B2 | 7/2004 | Nigam |
| 6,764,726 B1 | 7/2004 | Yang et al. |
| 6,790,514 B2 | 9/2004 | Almog et al. |
| 6,793,860 B2 | 9/2004 | Xing et al. |
| 6,824,844 B1 | 11/2004 | Kondo et al. |
| 6,861,112 B2 | 3/2005 | Morris et al. |
| 7,348,065 B2 | 3/2008 | Ono et al. |
| 7,361,399 B2 | 4/2008 | Sopg et al. |
| 7,749,580 B2 | 7/2010 | Song et al. |
| 7,828,935 B2 | 11/2010 | Huang et al. |
| 9,296,244 B2 * | 3/2016 | Song ............... B41M 5/52 |
| 2001/0044477 A1 | 11/2001 | Soane et al. |
| 2003/0008931 A1 | 1/2003 | Soane et al. |
| 2003/0008932 A1 | 1/2003 | Soane et al. |
| 2003/0048344 A1 | 3/2003 | Koga et al. |
| 2003/0072935 A1 | 4/2003 | Iwasa et al. |
| 2003/0118790 A1 | 6/2003 | IIda et al. |
| 2003/0124272 A1 | 7/2003 | Watson |
| 2004/0033323 A1 | 2/2004 | Gaynor et al. |
| 2004/0035292 A1 | 2/2004 | Dunn |
| 2004/0038056 A1 | 2/2004 | Song et al. |
| 2004/0055720 A1 | 3/2004 | Torras, Sr. et al. |
| 2004/0065423 A1 | 4/2004 | Swerin et al. |
| 2004/0096598 A1 | 5/2004 | Kasamatsu et al. |
| 2004/0121080 A1 | 6/2004 | Urscheler et al. |
| 2004/0123966 A1 | 7/2004 | Altman et al. |
| 2004/0157057 A1 | 8/2004 | Tasaki et al. |
| 2004/0202820 A1 | 10/2004 | Bharti |
| 2004/0244928 A1 | 12/2004 | Huang et al. |
| 2005/0251976 A1 | 11/2005 | Lipponen et al. |
| 2006/0102307 A1 | 5/2006 | Kron et al. |
| 2006/0159910 A1 | 7/2006 | Song et al. |
| 2008/0173420 A1 | 7/2008 | Song et al. |
| 2009/0014141 A1 | 1/2009 | Huang et al. |
| 2010/0080916 A1 | 4/2010 | Song et al. |
| 2011/0069106 A1 | 3/2011 | Song et al. |
| 2011/0146928 A1 | 6/2011 | Huang et al. |
| 2013/0216822 A1 | 8/2013 | Song et al. |
| 2016/0136986 A1 | 5/2016 | Song et al. |

FOREIGN PATENT DOCUMENTS

| | | |
|---|---|---|
| EP | 0322830 | 12/1988 |
| EP | 0650850 | 5/1995 |
| EP | 0652324 | 5/1995 |
| EP | 0758696 | 2/1997 |
| EP | 0778371 | 6/1997 |
| EP | 0789281 | 8/1997 |
| EP | 0666368 | 9/1999 |
| EP | 0938980 | 9/1999 |
| EP | 1112856 | 4/2001 |
| EP | 0629741 | 8/2001 |

(56) References Cited

FOREIGN PATENT DOCUMENTS

| | | |
|---|---|---|
| EP | 1165324 | 6/2004 |
| EP | 0879917 | 9/2004 |
| EP | 1658993 | 5/2006 |
| GB | 1171382 | 11/1969 |
| JP | 52055707 | 5/1977 |
| JP | 04201595 | 7/1992 |
| JP | 2000313168 | 11/2000 |
| WO | 199528285 | 10/1995 |
| WO | 199606384 | 2/1996 |
| WO | 199738053 | 10/1997 |
| WO | 199745590 | 12/1997 |
| WO | 1998052765 | 11/1998 |
| WO | 199919773 | 4/1999 |
| WO | 199932718 | 7/1999 |
| WO | 199961703 | 12/1999 |
| WO | 2000032407 | 6/2000 |
| WO | 200044568 | 8/2000 |
| WO | 200153895 | 7/2001 |
| WO | 2002084029 | 10/2002 |
| WO | 2004027145 | 4/2004 |
| WO | 2004092483 | 10/2004 |
| WO | 2005115763 | 12/2005 |

\* cited by examiner

PROCESS FOR MANUFACTURING RECORDING SHEET

CROSS-REFERENCE TO RELATED APPLICATIONS

This application is a divisional of application Ser. No. 12/557,810, filed 11 Sep. 2009, now U.S. Pat. No. 9,296,244 B2.

BACKGROUND

Field of the Invention

The invention relates to compositions useful for multifunctional printing, e.g., inkjet, dry and liquid toner electrophotographic (EP) printing, and recording sheets made with the composition.

Discussion of the Background

Commercially available, coated substrates for multifunctional printing, e.g., inkjet and liquid and dry toner electrophotographic (EP) printing currently do not provide sufficient toner adhesion for liquid toner digital printing presses. One example of a liquid toner digital press is the Indigo digital press available from Hewlett-Packard. The commercially available substrates are typically given a special surface treatment, which is applied prior to the printing process. Two special surface treatments are currently used: the so-called, "Sapphire" treatment, which is used for paper substrates; and the so-called, "Topaz" treatment, which is used for plastic films. In these treatments, a thin layer of polyethylene imine (PEI) is applied to the paper or plastic surface. WO 96/06384 describes the use of PEI or derivatives thereof or polyamides to impart a basic functionality to paper for use in liquid toner EP printing.

The Sapphire and Topaz treatments are costly because they require an off-line coating step after the paper has otherwise been completed. They are also unsatisfactory from a performance standpoint. Sapphire-coated papers perform only inconsistently due to aging of the chemical coating. The PEI-coated paper must be used within six months to ensure adequate toner adhesion. The PEI coating will also yellow over time. As such, these treatments are not a long term solution for EP printing.

US 2004/0244928 describes a paper composition suitable for liquid toner EP printing which avoids the use of PEI and which contains starch, an acrylic acid polymer, an organic material having an HLB value of about 2 to about 14, and water.

Other treatments have been advanced to enhance toner adhesion in liquid toner EP processes, but these are similarly unsatisfactory. EP 0879917 describes the use of an aluminate salt or a salt of a weak acid and a strong base to impart a basic functionality to the paper surface. It is disclosed that the use of a starch or other sizing agent is preferred. EP 116524 describes a paper substrate that contains an insoluble aluminum trihydrate in the base paper or magnesium sulfate, polyvinylpyrrolidone, starch, and polyvinyl alcohol at the paper surface. None of these treatments, however, provide adequate toner adhesion for the liquid toner used in digital EP printing, and none are suitable for multifunctional printing.

The inventors have discovered and solved the aforementioned problems and provide herein a composition and recording sheet that is suitable for liquid toner EP printing, dry toner EP printing, and inkjet printing.

SUMMARY

Quite surprisingly, the present inventors have found that it is possible to achieve superior toner adhesion in liquid toner electrophotograpic (EP) processes without sacrificing performance in dry toner or ink jet applications. One embodiment of the present invention achieves excellent toner retention performance in liquid EP applications. Another embodiment of the present invention achieves excellent toner retention performance in inkjet printing applications. Another embodiment of the present invention achieves excellent toner retention performance in dry toner printing applications. Another embodiment of the present invention achieves excellent print density performance in inkjet printing applications. Another embodiment of the present invention achieves excellent horizontal wicking performance in inkjet printing applications. Another embodiment of the present invention achieves excellent vertical wicking performance in inkjet printing applications. Another embodiment of the present invention achieves good color-to-color bleed performance in inkjet applications.

DETAILED DESCRIPTION OF THE SEVERAL EMBODIMENTS

The above advantages, and others, are obtained with the present invention. Compared to conventional or commercially available recording sheets, the present invention enables and/or achieves better toner adhesion in liquid EP processes, and it does so without sacrificing performance in dry toner or ink jet applications.

One embodiment of the present invention relates to a sizing or coating composition, comprising:

a first binder resin, which is compatible with dry toner binder resin;

a second binder resin, which is compatible with liquid toner binder resin, and which is different from the first binder resin;

a first pigment, which has a BET surface area of from greater than zero to about 35 $m^2/g$;

and a second pigment, which has a BET surface area of about 35 $m^2/g$ or greater, and which is different from the first pigment.

Another embodiment relates to a method for making a sizing or coating composition, comprising contacting, in any order:

a first binder resin, which is compatible with dry toner binder resin;

a second binder resin, which is compatible with liquid toner binder resin, and which is different from the first binder resin;

a first pigment, which has a BET surface area of from greater than zero to about 35 $m^2/g$;

and a second pigment, which has a BET surface area of about 35 $m^2/g$ or greater, and which is different from the first pigment, to produce the composition.

Another embodiment relates to a recording sheet, comprising:

a sizing or coating composition, comprising:
- a first binder resin, which is compatible with dry toner binder resin;
- a second binder resin, which is compatible with liquid toner binder resin, and which is different from the first binder resin;
- a first pigment, which has a BET surface area of from greater than zero to about 35 $m^2/g$; and
- a second pigment, which has a BET surface area of about 35 $m^2/g$ or greater, and which is different from the first pigment; and a paper or plastic substrate in contact with the composition.

Another embodiment relates to a method for making a recording sheet, comprising contacting, in any order:
  a first binder resin, which is compatible with dry toner binder resin;
  a second binder resin, which is compatible with liquid toner binder resin, and which is different from the first binder resin;
  a first pigment, which has a BET surface area of from greater than zero to about 35 m$^2$/g;
  a second pigment, which has a BET surface area of about 35 m$^2$/g or greater, and which is different from the first pigment;
  and a paper or plastic substrate,
  to produce the recording sheet.

Another embodiment relates to a method, comprising:
  forming an image with a printing apparatus on a surface of a recording sheet, the recording sheet comprising:
    a sizing or coating composition, comprising:
      a first binder resin, which is compatible with dry toner binder resin;
      a second binder resin, which is compatible with liquid toner binder resin, and which is different from the first binder resin;
      a first pigment, which has a BET surface area of from greater than zero to about 35 m$^2$/g; and
      a second pigment, which has a BET surface area of about 35 m$^2$/g or greater, and which is different from the first pigment; and
    a paper or plastic substrate in contact with the composition.

The composition includes a first binder resin, which is compatible with dry toner binder resin. Here, the term, "compatible with dry toner binder resin" is intended to mean those binder resins which are commonly used in coating or sizing compositions to make paper suitable for dry toner printing applications. Examples of dry toner printing applications include electrophotographic (EP) printing, xerography, dry toner laser printing, ionography, magnetography, and the like. It follows that the term, "dry toner binder" is intended to mean those binder resins which are commonly used in dry toners for dry toner printing applications. In one embodiment, the first binder resin is chemically similar to the binder resin used in the dry toner, or exhibits better toner adhesion to the dry toner binder resin than to liquid toner binder resin. Binder resins which are compatible with dry toner binders, and also dry toner binders themselves, are known in the art or otherwise easily determined given the teachings herein combined with the knowledge of one of ordinary skill in the papermaking and/or dry toner printing arts.

Non-limiting examples of the first binder resin include one or more of a styrene-acrylic acid copolymer, styrene-butadiene acrylonitrile copolymer, styrene actylate latex, epoxy, polyvinyl chloride, polyvinyl acetate, vinyl acetate acrylate copolymer, or a mixture thereof. Other examples of suitable first binder resins are disclosed in U.S. Patent Application Publication No. 2006/0159910, the relevant contents of which are hereby incorporated by reference.

The composition includes a second binder resin, which is compatible with liquid toner binder resin, and which is different from the first binder resin. Here, the term, "compatible with liquid toner binder resin" is intended to mean those binder resins which are commonly used in coating or sizing compositions to make paper suitable for liquid toner or liquid ink printing applications. Examples of liquid toner or liquid ink printing applications include INDIGO™ digital printing available from Hewlett-Packard, inkjet printing, continuous jet printing, drop-on-demand inkjet printing, liquid thermal/bubble jet printing, and the like. It follows that the term, "liquid toner binder resin" is intended to mean those binder resins which are commonly used in liquid toners for liquid toner printing applications. Alternatively, the term, "liquid toner binder resin" may also refer to those binder resins which are commonly used in coatings and/or sizing compositions for paper suitable for printing with liquid ink. In one embodiment, the second binder resin is chemically similar to the binder resin used in the liquid toner, or exhibits better toner adhesion to the liquid toner binder resin than to dry toner binder resin. Binder resins which are compatible with liquid inks, liquid toner binders, and also liquid toner binders themselves, are known in the art or otherwise easily determined given the teachings herein combined with the knowledge of one of ordinary skill in the papermaking and/or liquid toner printing arts.

Non-limiting examples of the second binder resin include one or more of a polyethylene acrylic acid copolymer, polyethylene methacrylic acid copolymer, polyethylene imine, or a mixture thereof. Other examples of suitable second binder resins are disclosed in U.S. Patent Application Publication No. 2004/0244928, the relevant contents of which are hereby incorporated by reference.

The amounts of the first and second binder resins are not particularly limited. They may be present in the composition in equal amounts or different amounts.

In one embodiment, the first binder resin is present in the composition in an amount ranging from about 1 to 30 parts by weight, based on the total weight of the composition. This range includes all values and subranges therebetween, including about 1, 2, 3, 4, 5, 6, 7, 8, 9, 10, 12, 14, 16, 18, 20, 22, 24, 26, 28, and 30 parts by weight, or any combination thereof.

In one embodiment, the second binder resin is present in the composition in an amount ranging from about 1 to 30 parts by weight, based on the total weight of the composition. This range includes all values and subranges therebetween, including about 1, 2, 3, 4, 5, 6, 7, 8, 9, 10, 12, 14, 16, 18, 20, 22, 24, 26, 28, and 30 parts by weight, or any combination thereof.

The composition includes a first pigment, which has a BET surface area of from greater than zero to about 35 m$^2$/g. This range includes all values and subranges therebetween, including greater than zero, about 0.5, 1, 2, 3, 4, 5, 6, 7, 8, 9, 10, 13, 15, 17, 19, 20, 21, 23, 25, 27, 29, 30, 31, 33, and 35 m$^2$/g, or any combination thereof.

The composition includes a second pigment, which has a BET surface area of about 35 m$^2$/g or greater, and which is different from the first pigment. This range includes all values and subranges therebetween, including greater than about 35, 36, 37, 38, 39, 40, 45, 50, 55, 60, 65, 70, 75, 80, 85, 90, 95, 100, 125, 150, 175, 200, 300, 400, 500, 600, 700 m$^2$/g, and greater, or any combination thereof. In one embodiment, the second pigment has a BET surface area of about 35-700 m$^2$/g.

So long as they have the requisite BET surface areas and so long as the second pigment is different from the first pigment, the first and second pigments are not particularly limited. Non-limiting examples of the first and second pigments include calcium carbonate, kaolin clay, calcined clay, aluminum trihydrate, titanium dioxide, talc, plastic pigment, ground calcium carbonate, precipitated calcium carbonate, amorphous silica, modified calcium carbonate, modified calcined clay, aluminum silicate, zeolite, aluminum oxide, colloidal silica, colloidal alumina slurry, modified calcium carbonate, modified ground calcium carbonate, modified precipitated calcium carbonate, or a mixture thereof.

Referring to the first and second pigments, the term, "different" is intended to mean that the second pigment is different from the first pigment in any quality other than BET surface area. Non-limiting examples of such qualities include physical, chemical, material, surface, density, crystallographic, and the like.

So long as it has a BET surface area of from greater than zero to about 35 $m^2/g$, the first pigment is not particularly limited. Non-limiting examples of the first pigment include calcium carbonate, kaolin clay, calcined clay, aluminum trihydrate, titanium dioxide, talc, plastic pigment, ground calcium carbonate, precipitated calcium carbonate, amorphous silica, modified calcium carbonate, modified calcined clay, aluminum silicate, zeolite, aluminum oxide, colloidal silica, colloidal alumina slurry, modified calcium carbonate, modified ground calcium carbonate, modified precipitated calcium carbonate, or a mixture thereof.

In one embodiment, non-limiting examples of the first pigment include calcium carbonate, kaolin clay, calcined clay, aluminum trihydrate, titanium dioxide, talc, plastic pigment, or a mixture thereof.

In one embodiment, the calcium carbonate is ground calcium carbonate, precipitated calcium carbonate, or a mixture thereof.

So long as it has a BET surface area of greater than about 35 $m^2/g$, and is different from the first pigment, the second pigment is not particularly limited. Non-limiting examples of the second pigment include calcium carbonate, kaolin clay, calcined clay, aluminum trihydrate, titanium dioxide, talc, plastic pigment, ground calcium carbonate, precipitated calcium carbonate, amorphous silica, modified calcium carbonate, modified calcined clay, aluminum silicate, zeolite, aluminum oxide, colloidal silica, colloidal alumina slurry, modified calcium carbonate, modified ground calcium carbonate, modified precipitated calcium carbonate, or a mixture thereof.

In one embodiment, non-limiting examples of the second pigment include amorphous silica, modified calcium carbonate, modified calcined clay, aluminum silicate, zeolite, aluminum oxide, colloidal silica, colloidal alumina slurry, or a mixture thereof.

In one embodiment, the modified calcium carbonate is modified ground calcium carbonate, modified precipitated calcium carbonate, or a mixture thereof. Here, the term, "modified" is sometimes referred to as "structured". These types of pigments are known to those skilled in the papermaking art.

The amounts of the first and second pigments are not particularly limited. They may be used in equal amounts or different amounts.

In one embodiment, the first pigment is present in the composition in an amount ranging from about 1 to 75 parts by weight, based on the weight of the composition. This range includes all values and subranges therebetween, including 1, 2, 3, 4, 5, 6, 7, 8, 9, 10, 15, 20, 25, 30, 35, 40, 45, 50, 55, 60, 65, 70, and about 75 parts by weight, or any combination thereof.

In one embodiment, the second pigment is present in the composition in an amount ranging from about 1 to 75 parts by weight, based on the weight of the composition. This range includes all values and subranges therebetween, including 1, 2, 3, 4, 5, 6, 7, 8, 9, 10, 15, 20, 25, 30, 35, 40, 45, 50, 55, 60, 65, 70, and about 75 parts by weight, or any combination thereof.

The composition may be suitably prepared by contacting, in any order, the first binder resin, the second binder resin, the first pigment, and the second pigment. The contacting may be carried out with mixing as appropriate.

In one embodiment, the composition may be prepared by contacting the first and second pigments, to produce a pigment mixture; and subsequently contacting the pigment mixture with the first binder resin, the second binder resin, or a mixture thereof.

In another embodiment, the composition may be prepared by contacting at least one of the first and second binder resins with at least one of the first and second pigments; and subsequently contacting the resulting product with the remaining components, in any order.

The composition may be suitably used as a sizing composition or a coating composition or a combination thereof. If used as a coating on a substrate, the composition may be used as a base coat, a top coat, or both. The composition may be prepared at any point in the papermaking process. In one embodiment, the contacting is carried out at a size press.

When applied to a substrate, the composition may be present in an amount ranging from about 0.1 to 20 $g/m^2$ (gsm). This range includes all values and subranges therebetween, including 0.1, 0.2, 0.3, 0.4, 0.5, 0.6, 0.7, 0.8, 0.9, 1, 2, 3, 4, 5, 6, 7, 8, 9, 10, 11, 12, 13, 14, 15, 16, 17, 18, 19, and 20 $g/m^2$, or any combination thereof.

When applied to a substrate to produce a recording sheet, the composition may be applied as a single continuous layer. Alternatively, the composition may be applied sequentially as two or more sublayers.

In the case wherein the composition is comprised of two or more sublayers in contact with one another, each sublayer may or may not contain all of the first binder resin, second binder resin, first pigment, and second pigment, but when combined the whole of the sublayers will be considered to include all of the first binder resin, second binder resin, first pigment, and second pigment of the composition described herein. For example, a coating composition may include a first layer, which is in contact with the substrate and which contains the first and second pigments and the second binder resin; and a second layer overlying and in contact with the first layer, which second layer contains the first binder resin.

When the composition is comprised of two or more sublayers, the first sublayer may lack one or more of the first binder resin, second binder resin, first pigment, or second pigment, or any combination thereof, and the second sublayer will contain at least that first binder resin, second binder resin, first pigment, or second pigment, or combination thereof, which is lacking from the first layer. In another embodiment, the first sublayer includes at least one of the first and second binder resins and at least one of the first and second pigments; and the second sublayer includes at least one of the first and second binder resins or the remaining components as the case may be.

In one embodiment, the composition is present only as a single layer.

The composition may be applied to a single side of a substrate or to both sides.

The composition may be in the form of a mixture, solution, aqueous solution, emulsion, dispersion, latex, or colloidal composition. The term "emulsion" is used herein, as is customary in the art, to mean either a dispersion of the liquid-in-liquid type or of the solid-in-liquid type, as well as latex or colloidal composition.

The composition may additionally and optionally include one or more of a water soluble divalent metal salt, complexing agent, optical brightening agent, sizing agent, nonreactive sizing agent, reactive sizing agent, stabilizer, modified starch, unmodified starch, defoamer, surfactant, slip agent, dispersant, dye, retention aid, binder, filler, thickener, preservative, solvent, wet strength resin, internal size, dry strength resin, alum, pigment, bulking agent, expandable microsphere, pulp fiber, diamide salt, reducing agent, or a mixture thereof.

The composition optionally includes one or more water soluble divalent metal salt. When used in a recording sheet, the recording sheet may suitably contain an effective amount of the divalent water soluble metal salt in contact with at least one surface of the substrate. Here, an "effective amount" may be an amount which is sufficient to improve good dry time or any other printing property. This total amount of divalent water soluble metal salt in the substrate can vary widely, for example, greater than or equal to 0.02 $g/m^2$, although lower or higher amounts can be used. Generally, however, and if present, the amount of divalent water soluble metal salt may range from about 0.02 $g/m^2$ to about 4 $g/m^2$, which ranges includes all values and subranges therebetween, including 0.02, 0.03, 0.04, 0.05, 0.06, 0.07, 0.08, 0.09, 0.1, 0.2, 0.3, 0.4, 0.5, 0.6, 0.7, 0.8, 0.9, 1, 1.5, 2, 2.25, 2.5, 2.75, 3, 3.25, 3.5, 3.75, and 4 $g/m^2$ or any combination thereof.

Some examples of divalent water soluble metal salts include but are not limited to compounds containing divalent calcium, magnesium, barium, zinc, or any combination of these. The counter ions (anions) may be simple or complex and may vary widely. Illustrative of such materials are calcium salts, calcium chloride, magnesium chloride, calcium acetate, calcium lactate, calcium EDTA, Mg EDTA, and the like, and combinations thereof. Various water soluble divalent metal salts are disclosed in U.S. Provisional Application No. 61/132,672, filed Jun. 20, 2008, the relevant contents of which are hereby incorporated by reference.

The composition optionally contains one or more complexing agents. Complexing agents include any compound, molecule, or the like that has a chemical, physical, or physicochemical affinity for the divalent metal. The affinity may be reversible or irreversible. In one embodiment, if the complexing agent and water soluble divalent metal are used together, the affinity results in an association between the complexing agent and the divalent metal, to form an associated complex.

If both of a divalent metal salt and complexing agent are present, the ratio of metal to complexing agent may suitably range from 10:1 to 1:10, or any value or subrange therebetween, including any one of 10, 9, 8, 7, 6, 5, 4, 3, 2, 1 to any one of 1, 2, 3, 4, 5, 6, 7, 8, 9, 10.

Some examples of complexing agents which may be optionally included include compounds having one or more electron donating atoms such as nitrogen, oxygen, phosphorus, sulfur, and the like, organic phosphonate, phosphate, carboxylic acid, dithiocarbamate, EDTA salt, EGTA salt, DTPA salt, crown ether, EDTA (CAS 60-00-4), EDTA disodium salt [6381-92-6], EDTA tetrasodium salt [194491-31-1], EDTA trisodium salt, EDTA disodium magnesium salt [14402-88-1], EDTA disodium calcium salt, EDTA diammonium salt [20824-56-0], EDTA dipotassium salt [25102-12-9], EDTA tripotassium salt [65501-24-8], EDTA dilithium salt [14531-56-7], EDTA tetramethylammonium salt, EDTA calcium salt, EDTA magnesium salt, EDTA aluminum salt, polyacrylic acid, polyacrylic acid salt, polysorbate, poly-4-styrene sulfonic acid salt, glycerol formal, formamidinesulinic acid, sodium hypophosphite, potassium hypophosphite, calcium hypophosphite, organic phosphonate, organic phosphate, carboxylic acid, dithiocarbamate, sorbitol, sorbic acid, cellulose ether, CMC cellulose, hydroxyethyl cellulose, PEG, PEG derivatives, PPG, PPG derivatives, ionic liquid, 1-butyl-3-methyl-imidazolium-thiocyanate, and salts thereof. Combinations are possible. Various complexing agents are disclosed in U.S. Provisional Application No. 61/132,672, filed Jun. 20, 2008, the relevant contents of which are hereby incorporated by reference.

If present, the amount of complexing agent is not particularly limiting. When starch is used in the composition, the complexing agent may be present in an amount ranging from about 0.01 Lb/100 Lb starch to about 100 Lb/100 Lb starch. This range includes all values and subranges therebetween, including about 0.01, 0.02, 0.03, 0.04, 0.05, 0.06, 0.07, 0.08, 0.09, 0.1, 0.2, 0.3, 0.4, 0.5, 0.6, 0.7, 0.8, 0.9, 10, 15, 20, 25, 30, 35, 40, 45, 50, 55, 60, 65, 70, 75, 80, 85, 90, 95, 99, and 100 Lb complexing agent/100 Lb starch. If no starch is used, then the complexing agent may be present in the composition in an amount ranging from about 0.01 Lb/ton of paper to about 100 Lb/ton of substrate. This range includes all values and subranges therebetween, including about 0.01, 0.02, 0.03, 0.04, 0.05, 0.06, 0.07, 0.08, 0.09, 0.1, 0.2, 0.3, 0.4, 0.5, 0.6, 0.7, 0.8, 0.9, 10, 15, 20, 25, 30, 35, 40, 45, 50, 55, 60, 65, 70, 75, 80, 85, 90, 95, 99, and 100 Lb complexing agent/ton of substrate. In one embodiment, the amount of complexing agent ranges from about 0.1 to about 10 Lbs/ton of substrate.

The composition optionally contains one or more optical brightening agents, sometimes referred to as optical brighteners or OBAs. Typically, the optical brightening agents are fluorescent dyes or pigments that absorb ultraviolet radiation and reemit it at a higher wavelengths in the visible spectrum (blue), thereby effecting a white, bright appearance to the paper sheet when added to the stock furnish, but any optical brightening agent may be used. Representative optical brighteners include, but are not limited to azoles, biphenyls, coumarins, furans, stilbenes, ionic brighteners, including anionic, cationic, and anionic (neutral) compounds, such as the Eccobrite™ and Eccowhite™ compounds available from Eastern Color & Chemical Co. (Providence, R.I.); naphthalimides; pyrazenes; substituted (e.g., sulfonated) stilbenes, such as the Leucophor™ range of optical brighteners available from the Clariant Corporation (Muttenz, Switzerland), and Tinopal™ from Ciba Specialty Chemicals (Basel, Switzerland); salts of such compounds including but not limited to alkali metal salts, alkaline earth metal salts, transition metal salts, organic salts and ammonium salts of such brightening agents; and combinations of one or more of the foregoing agents.

If present, the amount of optical brightening agent is not particularly limited. When used in the composition, and if starch is present, the optical brighteners may be added in any amount ranging from 10 to 100 pounds per 100 pounds of starch. This range includes all values and subranges therebetween, including 10, 15, 20, 25, 30, 35, 40, 45, 50, 55, 60, 65, 70, 75, 80, 85, 90, 95 and 100 pounds. In another embodiment, the optical brightening agent may be added in amounts ranging from about 0.005 to about 4 weight percent based on the weight of the recording sheet. This range includes all values and subranges therebetween, including about 0.005, 0.006, 0.007, 0.008, 0.009, 0.01, 0.02, 0.03, 0.04, 0.05, 0.06, 0.07, 0.08, 0.09, 0.1, 0.2, 0.3, 0.4, 0.5, 0.6, 0.7, 0.8, 0.9, 1, 2, 3, and 4 weight percent based on the weight of the substrate product. Various optical brightening agents are disclosed in U.S. Provisional Application No.

61/132,672, filed Jun. 20, 2008, the relevant contents of which are hereby incorporated by reference.

In one embodiment, a water soluble divalent metal salt, complexing agent, and optical brightener may be combined with the composition to achieve better brightness and whiteness.

The composition may optionally contain one or more sizing agents. The sizing agent is not particularly limited, and any conventional papermaking sizing agent may be used. The sizing agent may be nonreactive, reactive, or a combination of nonreactive and reactive. The sizing agent may, optionally and if desired, impart a moisture or water-resistance in varying degrees to the paper substrate. Non-limiting examples of sizing agents can be found in the "Handbook for Pulp and Paper Technologists" by G. A. Smook (1992), Angus Wilde Publications, which is hereby incorporated, in its entirety, by reference. Preferably, the sizing agent is a surface sizing agent. Preferable examples of sizing agents are starch, alkyl ketene dimer (AKD), alkenyl ketene dimer (ALKD), alkenyl succinic anhydride (ASA), ASA/ALKD, styrene acrylic emulsion (SAE) polyvinyl alcohol (PVOH), polyvinylamine, alginate, carboxymethyl cellulose, etc. However, any sizing agent may be used. See, for example, the sizing agents disclosed in U.S. Pat. No. 6,207,258, the entire contents of which are hereby incorporated by reference.

Many nonreactive sizing agents are known in the art. Examples include, without limitation, BASOPLAST® 335D nonreactive polymeric surface size emulsion from BASF Corporation (Mt. Olive, N.J.), FLEXBOND® 325 emulsion of a copolymer of vinyl acetate and butyl acrylate from Air Products and Chemicals, Inc. (Trexiertown, Pa.), and PENTAPRINT® nonreactive sizing agents (disclosed for example in Published International Patent Application Publication No. WO 97/45590, published Dec. 4, 1997, corresponding to U.S. patent application Ser. No. 08/861,925, filed May 22, 1997, the entire contents of which are hereby incorporated by reference) from Hercules Incorporated (Wilmington, Del.).

For papermaking carried out under alkaline pH manufacturing conditions, sizing agents based on alkyl ketene dimers (AKDs) or alkenyl ketene dimers (ALKDs) or multimers and alkenyl succinic anhydride (ASA) sizing agents may be suitably used. Combinations of these and other sizing agents may also be employed.

Ketene dimers used as sizing agents for papermaking are well known. AKDs, containing one β-lactone ring, are typically prepared by the dimerization of alkyl ketenes made from two fatty acid chlorides. Commercial alkyl ketene dimer sizing agents are often prepared from palmitic and/or stearic fatty acids, e.g. Hereon® and Aquapel® sizing agents (both from Hercules Incorporated).

Alkenyl ketene dimer sizing agents are also commercially available, e.g. Precis® sizing agents (Hercules Incorporated).

U.S. Pat. No. 4,017,431, the entire contents of which are hereby incorporated by reference, provides a nonlimiting exemplary disclosure of AKD sizing agents with wax blends and water soluble cationic resins.

Ketene multimers containing more than one β-lactone ring may also be employed as sizing agents.

Sizing agents prepared from a mixture of mono- and dicarboxylic acids, have been disclosed as sizing agents for paper in Japanese Kokai Nos. 168991/89 and 168992/89.

European patent application Publication No. 0 629 741 A1 discloses alkyl ketene dimer and multimer mixtures as sizing agents in paper used in high speed converting and reprographic machines. The alkyl ketene multimers are made from the reaction of a molar excess of monocarboxylic acid, typically a fatty acid, with a dicarboxylic acid. These multimer compounds are solids at 25° C.

European patent application Publication No. 0 666 368 A2 and Bottorff et al. in U.S. Pat. No. 5,685,815, the entire contents of which are hereby incorporated by reference, disclose paper for high speed or reprographic operations that is internally sized with an alkyl or alkenyl ketene dimer and/or multimer sizing agent. The preferred 2-oxetanone multimers are prepared with fatty acid to diacid ratios ranging from 1:1 to 3.5:1.

Commercial ASA-based sizing agents are dispersions or emulsions of materials that may be prepared by the reaction of maleic anhydride with an olefin ($C_{14}$-$C_{18}$).

Examples of hydrophobic acid anhydrides useful as sizing agents for paper include:

(i) rosin anhydride (see U.S. Pat. No. 3,582,464, for example, the entire contents of which are hereby incorporated by reference);

(ii) anhydrides having the structure (I):

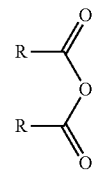

where each R is the same or a different hydrocarbon radical; and (iii) cyclic dicarboxylic acid anhydrides, such as those having the structure (II):

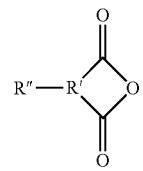

where R' represents a dimethylene or trimethylene radical and where R" is a hydrocarbon radical.

Some examples of anhydrides of structure (I) include myristoyl anhydride; palmitoyl anhydride; olcoyl anhydride; and stearoyl anhydride.

Examples of substituted cyclic dicarboxylic acid anhydrides falling within the above formula (II) include substituted succinic, glutaric anhydrides, i- and n-octadecenyl succinic acid anhydride; i- and n-hexadecenyl succinic acid anhydride; i- and n-tetradecenyl succinic acid anhydride, dodecyl succinic acid anhydride; decenyl succinic acid anhydride; ectenyl succinic acid anhydride; and heptyl glutaric acid anhydride.

Other examples of nonreactive sizing agents include a polymer emulsion, a cationic polymer emulsion, an amphoteric polymer emulsion, polymer emulsion wherein at least one monomer is selected from the group including styrene, α-methylstyrene, acrylate with an ester substituent with 1 to 13 carbon atoms, methacrylate having an ester substituent with 1 to 13 carbon atoms, acrylonitrile, methacrylonitrile, vinyl acetate, ethylene and butadiene; and optionally including acrylic acid, methacrylic acid, maleic anhydride, esters of maleic anhydride or mixtures thereof, with an acid number less than about 80, and mixtures thereof.

If desired, the polymer emulsion may stabilized by a stabilizer predominantly including degraded starch, such as that disclosed, for example, in U.S. Pat. Nos. 4,835,212, 4,855,343, and 5,358,998, the entire contents of each of which are hereby incorporated by reference. If desired, a polymer emulsion may be used in which the polymer has a glass transition temperature of about −15° C. to about 50° C.

For traditional acid pH papermaking conditions, nonreactive sizing agents in the form of dispersed rosin sizing agents may be suitably used. Dispersed rosin sizing agents are well known. Nonlimiting examples of rosin sizing agents are disclosed in, for example, U.S. Pat. Nos. 3,966,654 and 4,263,182, the entire contents of each of which are hereby incorporated by reference.

The rosin may be any modified or unmodified, dispersible or emulsifiable rosin suitable for sizing paper, including unfortified rosin, fortified rosin and extended rosin, as well as rosin esters, and mixtures and blends thereof. As used herein, the term "rosin" means any of these forms of dispersed rosin useful in a sizing agent.

The rosin in dispersed form is not particularly limited, and any of the commercially available types of rosin, such as wood rosin, gum rosin, tall oil rosin, and mixtures of any two or more, in their crude or refined state, may be used. In one embodiment, tall oil rosin and gum rosin are used. Partially hydrogenated rosins and polymerized rosins, as well as rosins that have been treated to inhibit crystallization, such as by heat treatment or reaction with formaldehyde, may also be employed.

The fortified rosin is not particularly limited. One example of such a rosin includes the adduct reaction product of rosin and an acidic compound containing the

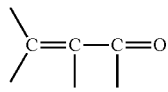

group and is derived by reacting rosin and the acidic compound at elevated temperatures of from about 150° C. to about 210° C. Methods of preparing fortified rosin are well known to those skilled in the art. See, for example, the methods disclosed and described in U.S. Pat. Nos. 2,628,918 and 2,684,300, the entire contents of each of which are hereby incorporated by reference.

Examples of acidic compounds containing the

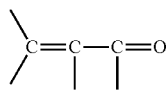

group that can be used to prepare the fortified rosin include the α-β-unsaturated organic acids and their available anhydrides, specific examples of which include fumaric acid, maleic acid, acrylic acid, maleic anhydride, itaconic acid, itaconic anhydride, citraconic acid and citraconic anhydride. Mixtures of acids can be used to prepare the fortified rosin if desired.

Thus, for example, a mixture of the acrylic acid adduct of rosin and the fumaric acid adduct can be used to prepare a dispersed rosin sizing agent. Also, fortified rosin that has been substantially completely hydrogenated after adduct formation can be used.

Rosin esters may also be used in the dispersed rosin sizing agents. Suitable exemplary rosin esters may be rosin esterified as disclosed in U.S. Pat. No. 4,540,635 (Ronge et al.) or U.S. Pat. No. 5,201,944 (Nakata et al.), the entire contents of each of which are hereby incorporated by reference.

The unfortified or fortified rosin or rosin esters can be extended if desired by known extenders such as waxes (particularly paraffin wax and microcrystalline wax); hydrocarbon resins including those derived from petroleum hydrocarbons and terpenes; and the like. This may be suitably accomplished by melt blending or solution blending with the rosin or fortified rosin from about 10% to about 100% by weight, based on the weight of rosin or fortified rosin, of the extender.

Blends of fortified rosin and unfortified rosin; blends of fortified rosin, unfortified rosin, rosin esters and rosin extender can be used. Blends of fortified and unfortified rosin may include, for example, about 25% to 95% fortified rosin and about 75% to 5% unfortified rosin. Blends of fortified rosin, unfortified rosin, and rosin extender may include, for example, about 5% to 45% fortified rosin, 0 to 50% rosin, and about 5% to 90% rosin extender.

Hydrophobic organic isocyanates, e.g., alkylated isocyanates, may also be used as sizing agents.

Other conventional paper sizing agents include alkyl carbamoyl chlorides, alkylated melamines such as stearylated melamines, and styrene acrylates.

Mixtures of sizing agents are possible.

An external sizing agent or both internal and surface sizing agents may be used. Either or both may contain the divalent metal salt, the optical brightening agent, and the complexing agent. When both internal and external sizing agents are present, they may be present in any weight ratio and may be the same and/or different. In one embodiment, the weight ratio of surface sizing agent to internal sizing agent is from 50/50 to 100/0, more preferably from 75/25 to 100/0 surface/internal sizing agent. This range includes 50/50, 55/45, 60/40, 65/35, 70/30, 75/25, 80/20, 85/15, 90/10, 95/5 and 100/0, including any and all ranges and subranges therein. One example of an internal sizing agent is alkenyl succinic anhydride (ASA).

When starch is used as a sizing agent, starch may be modified or unmodified. Examples of starch may be found in the "Handbook for Pulp and Paper Technologists" by G. A. Smook (1992), Angus Wilde Publications, mentioned above. Preferable examples of modified starches include, for example, oxidized, cationic, ethylated, hydroethoxylated, etc. In addition, the starch may come from any source, preferably potato and/or corn. Most preferably, the starch source is corn.

In one embodiment, a mixture comprising the composition and one or more starches is in contact with at least one surface of the substrate. Illustrative of useful starches include naturally occurring carbohydrates synthesized in corn, tapioca, potato and other plants by polymerization of dextrose units. All such starches and modified forms thereof such as starch acetates, starch esters, starch ethers, starch phosphates, starch xanthates, anionic starches, cationic starches, oxidized starches, and the like which can be derived by reacting the starch with a suitable chemical or enzymatic reagent can be used. If desired, starches may be prepared by known techniques or obtained from commercial sources. For example, one example of a commercial starches include Ethylex 2035 from A.E. Staley, PG-280 from Penford Products, oxidized corn starches from ADM, Cargill, and Raisio, and enzyme converted starches such as Amyzet 150 from Amylum.

Modified starches may be used. Non-limiting examples of a type of modified starches include cationic modified chemically modified starches such as ethylated starches, oxidized starches, and AP and enzyme converted Pearl starches. Most preferred are chemically modified starches such as ethylated starches, oxidized starches, and AP and enzyme converted Pearl starches.

In one embodiment, the composition and/or sizing agent is applied in an amount such such that a dry pickup of 30 to 150 lbs of starch/ton of paper at 12-50% solids for the size press formulation. Here, lbs/ton is calculated on a substrate, e.g., paper having a basis weight equal to 75 gsm.

The aforementioned range of starch includes all values and subranges therebetween, including 30, 35, 40, 45, 50, 55, 60, 65, 70, 75, 80, 85, 90, 95, 100, 105, 110, 115, 120, 125, 130, 135, 140, 145, and 150 lbs/ton. Here, lbs/ton is calculated on a paper having a basis weight equal to 75 gsm.

It should be readily apparent that the amounts in lbs/ton and moles/ton may vary in a known manner according to the basis weight of the paper, and the invention is not limited to only paper having a basis weight of 75 gsm.

In one embodiment, wherein an I-beam structure is formed, and calcium chloride and a sizing agent are present in the composition, which is applied to both sides of a paper substrate, the amount ranges from about 2 to about 8 lbs of $CaCl_2$/ton of paper on a paper having a basis weight equal to 75 gsm. This range includes all values and subranges therebetween, including about 2, 3, 4, 5, 6, 7, and 8 lbs of $CaCl_2$/ton of paper. This range is equal to a range from about 0.6 to 8 lbs of $CaCl_2$/ton of paper on a paper having a basis weight equal to 250 gsm. This range includes all values and subranges therebetween, including 0.6, 1, 2, 3, 4, 5, 6, 7, and 8 lbs of $CaCl_2$/ton of paper.

Examples of optional fillers include, but are not limited to, clay, calcium carbonate, calcium sulfate hemihydrate, and calcium sulfate dehydrate, chalk, GCC, PCC, and the like.

Examples of optional binders include, but are not limited to, polyvinyl alcohol, Amres (a Kymene type), Bayer Parez, polychloride emulsion, modified starch such as hydroxyethyl starch, starch, polyacrylamide, modified polyacrylamide, polyol, polyol carbonyl adduct, ethanedial/polyol condensate, polyamide, epichlorohydrin, glyoxal, glyoxal urea, ethanedial, aliphatic polyisocyanate, isocyanate, 1,6 hexamethylene diisocyanate, diisocyanate, polyisocyanate, polyester, polyester resin, polyacrylate, polyacrylate resin, acrylate, and methacrylate. Other optional substances include, but are not limited to silicas such as colloids and/or sols. Examples of silicas include, but are not limited to, sodium silicate and/or borosilicates. Another example of optional substances are solvents including but not limited to solvents such as water. Combinations of optional substances are possible.

In one embodiment, the recording sheet may contain from 0.001 to 20 wt % of the optional substances based on the total weight of the substrate, preferably from 0.01 to 10 wt %, most preferably 0.1 to 5.0 wt %, of each of at least one of the optional substances. This range includes 0.001, 0.002, 0.005, 0.006, 0.008, 0.01, 0.02, 0.03, 0.04, 0.05, 0.1, 0.2, 0.4, 0.5, 0.6, 0.7, 0.8, 0.9, 1, 2, 4, 5, 6, 8, 10, 12, 14, 15, 16, 18, and 20 wt % based on the total weight of the substrate, including any and all ranges and subranges therein.

The paper substrate or sizing agent may optionally contain a bulking agent in any amount, if present, ranging from 0.25 to 50 dry lbs per ton of finished substrate, preferably from 5 to 20, dry lb per ton of finished product when such bulking means is an additive. This range includes 0.25, 0.5, 0.75, 1.0, 2.0, 2.5, 3.0, 3.5, 4, 4.5, 5, 5.5, 6, 6.5, 7, 7.5, 8, 8.5, 9, 9.5, 10, 11, 12, 13, 14, 15, 20, 25, 30, 35, 40, 45, and 50 dry lb per ton of finished product, including any and all ranges and subranges therein.

The bulking agent is not particularly limited, and may be an expandable microsphere, composition, and/or particle. Some examples of bulking agents include, but are not limited to, surfactants, Reactopaque, pre-expanded spheres, BCTMP (bleached chemi-thermomechanical pulp), microfinishing, and multiply construction for creating an I-beam effect in a paper or paper board substrate. Such bulking agents may, when incorporated or applied to a paper substrate, improve print quality, caliper, basis weight, etc., in the absence of harsh calendaring conditions (i.e. pressure at a single nip and/or less nips per calendaring means), yet produce a paper substrate having the a single, a portion of, or combination of the physical specifications and performance characteristics mentioned herein.

In one embodiment, the paper substrate may contain from 0.001 to 10 wt %, preferably from 0.02 to 5 wt %, more preferably from 0.025 to 2 wt %, most preferably from 0.125 to 0.5 wt % of expandable microspheres based on the total weight of the substrate.

Some examples of expandable microspheres having bulking capacity are those described in U.S. Patent Application No. 60/660,703 filed Mar. 11, 2005, and U.S. patent application Ser. No. 11/374,239 filed Mar. 13, 2006, which are also hereby incorporated, in their entirety, by reference. Further examples include those found in U.S. Pat. No. 6,379,497, filed May 19, 1999, and U.S. Patent Publication No. 2006/0102307, filed Jun. 1, 2004, which are also hereby incorporated, in their entirety, by reference.

Other examples of bulking fibers include, but are not limited to, mechanical fibers such as ground wood pulp, BCTMP, and other mechanical and/or semi-mechanical pulps. When such pulps are added, from 0.25 to 75 wt %, preferably less than 60 wt % of total weight of the fibers used may be from such bulking fibers.

Examples of diamide salts include those described in U.S. Patent Publication No. 2004/0065423, filed Sep. 15, 2003, which is hereby incorporated in its entirety by reference. Non-limiting examples of such salts include mono- and distearamides of animoethylethalonalamine, which may be commercially known as Reactopaque 100, (Omnova Solutions Inc., Performance Chemicals, 1476 J. A. Cochran By-Pass, Chester, S.C. 29706, USA and marketed and sold by Ondeo Nalco Co., with headquarters at Ondeo Nalco Center, Naperville, Ill. 60563, USA) or chemical equivalents thereof. When such salts are used, about 0.025 to about 0.25 wt % by weight dry basis of the diamide salt may be used.

Other optional components include nitrogen containing compounds. Non-limiting examples of these include nitrogen containing organic species, for example oligomers and polymers which contain one or more quaternary ammonium functional groups. Such functional groups may vary widely and include, for example, substituted and unsubstituted amines, imines, amides, urethanes, quaternary ammonium groups, dicyandiamides, guanides, and the like. Illustrative of such materials are polyamines, polyethyleneimines, copolymers of diallyldimethyl ammonium chloride (DADMAC), copolymers of vinyl pyrrolidone (VP) with quaternized diethylaminoethylmethacrylate (DEAMEMA), polyamides, cationic polyurethane latex, cationic polyvinyl alcohol, polyalkylamines dicyandiamid copolymers, amine glycigyl addition polymers, poly[oxyethylene(dimethyliminio)ethylene(dimethyliminio)ethylene] dichlorides, guanidine polymers, and polymeric biguanides. Combinations of these nitrogen containing compounds are possible. Some examples of these compounds are described in, for example, U.S. Pat. No. 4,554,181, U.S. Pat. No. 6,485,139, U.S. Pat. No. 6,686,054, U.S. Pat. No. 6,761,977 and U.S. Pat. No. 6,764,726, the entireties of each of which being hereby incorporated by reference.

The expandable microspheres may contain an expandable shell forming a void inside thereof. The expandable shell may comprise a carbon and/or heteroatom containing compound. An example of a carbon and/or heteroatom containing compound may be an organic polymer and/or copolymer. The polymer and/or copolymer may be branched and/or crosslinked.

Expandable microspheres preferably are heat expandable thermoplastic polymeric hollow spheres containing a thermally activatable expanding agent. Examples of expandable microsphere compositions, their contents, methods of manufacture, and uses can be found, in U.S. Pat. Nos. 3,615,972; 3,864,181; 4,006,273; 4,044,176; and 6,617,364 which are hereby incorporated, in their entirety, herein by reference. Further reference can be made to U.S. Patent Publication Nos. 2001/0044477; 2003/0008931; 2003/0008932; and 2004/0157057, which are hereby incorporated, in their entirety, by reference. Microspheres may be prepared from polyvinylidene chloride, polyacrylonitrile, poly-alkyl methacrylates, polystyrene or vinyl chloride.

Microspheres may contain a polymer and/or copolymer that has a Tg ranging from −150 to +180° C. as appropriate.

Microspheres may also contain one or more blowing agents which, upon application of heat, functions to pressurize and expand the microsphere. Blowing agents may be liquids and/or gases. Further, examples of blowing agents may be selected from low boiling point molecules and compositions thereof. Such blowing agents may be selected from the lower alkanes such as neopentane, neohexane, hexane, propane, butane, pentane, and mixtures and isomers thereof. Isobutane is the preferred blowing agent for polyvinylidene chloride microspheres. Examples of coated unexpanded and expanded microspheres are disclosed in U.S. Pat. Nos. 4,722,943 and 4,829,094, which are hereby incorporated, in their entirety, by reference.

The expandable microspheres may have a mean diameter ranging from about 0.5 to 200 microns as appropriate in the unexpanded state and having a maximum expansion of from about 1.5 and 10 times the mean diameters.

In one embodiment, the expandable microspheres may be neutral, negatively or positively charged, preferably negatively charged.

The substrate may be a paper substrate, a plastic substrate, or a combination thereof. Referring to the substrate, unless indicated otherwise, the terms paper and plastic may be used interchangeably herein.

In one embodiment, the composition is applied to plastic substrate to produce a recording sheet. The plastic substrate may be suitably made of a polymeric material, for example, one that is resistant to tearing and thermal damage which may be caused by heat in a copier or printer. Some non-limiting examples of polymeric materials include thermoplastic polymers, such as polyesters, polysulfones, polyvinyl chloride, polyvinyl acetate, polycarbonates, polymethylmethacrylate, cellulose esters, fluoropolymers. biaxially oriented polypropylene (BOPP), polyvinyl chloride (PVC), and polyethylene terephthalate (PET), blends thereof, copolymers thereof, and the like. Combinations of polymeric materials may be used. The plastic substrate may be transparent, translucent, or opaque.

The thickness of the plastic substrate is not generally limiting, and may be any thickness suitable for any printing application. In one embodiment, the thickness ranges from about 1 to 12 mils. This range includes all values and subranges therebetween, including about 1, 2, 3, 4, 5, 6, 7, 8, 9, 10, 11, and 12 mils.

The plastic substrate may be clear or transparent, opaque, or anything in between. In one embodiment, a clear or transparent polyethylene terephthalate (PET) or an opaque polyvinyl chloride (PVC) film may be used. If desired, the plastic substrate may be pre-treated with conventional adhesion promoters on one surface or both surfaces to enhance adhesion of the coating composition to the plastic substrate.

In one embodiment, the composition is applied to a paper substrate to produce a recording sheet. The paper substrate suitably comprises a plurality of cellulosic fibers. The type of cellulosic fiber is not critical, and any such fiber known or suitable for use in paper making can be used. For example, the substrate can made from pulp fibers derived from hardwood trees, softwood trees, or a combination of hardwood and softwood trees. The fibers may be prepared for use in a papermaking furnish by one or more known or suitable digestion, refining, and/or bleaching operations such as, for example, known mechanical, thermomechanical, chemical and/or semichemical pulping and/or other well known pulping processes. The term, "hardwood pulps" as may be used herein include fibrous pulp derived from the woody substance of deciduous trees (angiosperms) such as birch, oak, beech, maple, and eucalyptus. The term, "softwood pulps" as may be used herein include fibrous pulps derived from the woody substance of coniferous trees (gymnosperms) such as varieties of fir, spruce, and pine, as for example loblolly pine, slash pine, Colorado spruce, balsam fir and Douglas fir. In some embodiments, at least a portion of the pulp fibers may be provided from non-woody herbaceous plants including, but not limited to, kenaf, hemp, jute, flax, sisal, or abaca, although legal restrictions and other considerations may make the utilization of hemp and other fiber sources impractical or impossible. Either bleached or unbleached pulp fiber may be utilized. Recycled pulp fibers are also suitable for use.

The paper substrate may suitably contain from 1 to 99 wt % of cellulosic fibers based upon the total weight of the substrate. In one embodiment, the paper substrate may contain from 5 to 95 wt % of cellulosic fibers based upon the total weight of the substrate. These ranges include any and all values and subranges therebetween, for example, 1, 5, 10, 15, 20, 25, 30, 35, 40, 45, 50, 55, 60, 65, 70, 75, 80, 85, 90, 95 and 99 wt %.

The paper substrate may optionally contain from 1 to 100 wt % cellulosic fibers originating from softwood species based upon the total amount of cellulosic fibers in the paper substrate. In one embodiment, the paper substrate may contain 10 to 60 wt % cellulosic fibers originating from softwood species based upon the total amount of cellulosic fibers in the paper substrate. These ranges include 1, 2, 5, 10, 15, 20, 25, 30, 35, 40, 45, 50, 55, 60, 65, 70, 75, 80, 85, 90, 95, and 100 wt % and any and all ranges and subranges therein, based upon the total amount of cellulosic fibers in the paper substrate.

In one embodiment, the paper substrate may alternatively or overlappingly contain from 0.01 to 99 wt % fibers from softwood species, based on the total weight of the paper substrate. In another embodiment, the paper substrate may contain from 10 to 60 wt % fibers from softwood species based upon the total weight of the paper substrate. These ranges include any and all values and subranges therein. For example, the paper substrate may contain not more than 0.01, 0.05, 0.1, 0.2, 0.5, 1, 2, 3, 4, 5, 6, 7, 8, 9, 10, 12, 15, 20, 25, 30, 35, 40, 45, 50, 55, 60, 65, 70, 75, 80, 85, 90, 95 and 99 wt % softwood based upon the total weight of the paper substrate.

All or part of the softwood fibers may optionally originate from softwood species having a Canadian Standard Freeness (CSF) of from 300 to 750. In one embodiment, the paper substrate contains fibers from a softwood species having a CSF from 400 to 550. These ranges include any and all values and subranges therebetwen, for example, 300, 310, 320, 330, 340, 350, 360, 370, 380, 390, 400, 410, 420, 430, 440, 450, 460, 470, 480, 490, 500, 510, 520, 530, 540, 550, 560, 570, 580, 590, 600, 610, 620, 630, 640, 650, 660, 670, 680, 690, 700, 710, 720, 730, 740, and 750 CSF. Canadian Standard Freeness is as measured by TAPPI T-227 standard test.

The paper substrate may optionally contain from 1 to 100 wt % cellulosic fibers originating from hardwood species based upon the total amount of cellulosic fibers in the paper substrate. In one embodiment, the paper substrate may contain from 30 to 90 wt % cellulosic fibers originating from hardwood species, based upon the total amount of cellulosic fibers in the paper substrate. These ranges include 1, 2, 5, 10, 15, 20, 25, 30, 35, 40, 45, 50, 55, 60, 65, 70, 75, 80, 85, 90, 95, and 100 wt %, and any and all values and subranges therein, based upon the total amount of cellulosic fibers in the paper substrate.

In one embodiment, the paper substrate may alternatively or overlappingly contain from 0.01 to 99 wt % fibers from hardwood species, based upon the total weight of the paper substrate. In another embodiment, the paper substrate may alternatively or overlappingly contain from 60 to 90 wt % fibers from hardwood species, based upon the total weight of the paper substrate. These ranges include any and all values and subranges therebetween, including not more than 0.01, 0.05, 0.1, 0.2, 0.5, 1, 2, 3, 4, 5, 6, 7, 8, 9, 10, 12, 15, 20, 25, 30, 35, 40, 45, 50, 55, 60, 65, 70, 75, 80, 85, 90, 95, 99 and 99 wt %, based upon the total weight of the paper substrate.

All or part of the hardwood fibers may optionally originate from hardwood species having a Canadian Standard Freeness of from 300 to 750. In one embodiment, the paper substrate may contain fibers from hardwood species having CSF values of from 400 to 550. These ranges include 300, 310, 320, 330, 340, 350, 360, 370, 380, 390, 400, 410, 420, 430, 440, 450, 460, 470, 480, 490, 500, 510, 520, 530, 540, 550, 560, 570, 580, 590, 600, 610, 620, 630, 640, 650, 660, 670, 680, 690, 700, 710, 720, 730, 740, and 750 CSF, and any and all ranges and subranges therein.

The paper substrate may optionally contain less refined fibers, for example, less refined softwood fibers, less refined hardwood, or both. Combinations of less refined and more refined fibers are possible. In one embodiment, the paper substrate contains fibers that are at least 2% less refined than that of fibers used in conventional paper substrates. This range includes all values and subranges therebetween, including at least 2, 5, 10, 15, and 20%. For example, if a conventional paper contains fibers, softwood and/or hardwood, having a Canadian Standard Freeness of 350, then, in one embodiment, the paper substrate may contain fibers having a CSF of 385 (i.e. refined 10% less than conventional) and still perform similar, if not better, than the conventional paper. Nonlimiting examples of some performance qualities of the paper substrate are discussed below. Examples of some reductions in refining of hardwood and/or softwood fibers include, but are not limited to: 1) from 350 to at least 385 CSF; 2) from 350 to at least 400 CSF; 3) from 400 to at least 450 CSF; and 4) from 450 to at least 500 CSF. In some embodiments, the reduction in fiber refinement may be at least 2, 3, 4, 5, 6, 7, 8, 9, 10, 11, 12, 13, 14, 15, 16, 17, 18, 19, 20, and 25% reduction in refining compared to those fibers in conventional paper substrates.

When the paper substrate contains both hardwood fibers and softwood fibers, the hardwood/softwood fiber weight ratio may optionally range from 0.001 to 1000. In one embodiment, the hardwood/softwood ratio may range from 90/10 to 30/60. These ranges include all values and subranges therebetween, including 0.001, 0.002, 0.005, 0.01, 0.02, 0.05, 0.1, 0.2, 0.5, 1, 2, 5, 10, 15, 20, 25, 30, 35, 40, 45, 50, 55, 60, 65, 70, 75, 80, 85, 90, 95, 100, 200, 300, 400, 500, 600, 700, 800, 900, and 1000.

The softwood fibers, hardwood fibers, or both may be optionally modified by physical and/or chemical processes. Examples of physical processes include, but are not limited to, electromagnetic and mechanical processes. Examples of electrical modifications include, but are not limited to, processes involving contacting the fibers with an electromagnetic energy source such as light and/or electrical current. Examples of mechanical modifications include, but are not limited to, processes involving contacting an inanimate object with the fibers. Examples of such inanimate objects include those with sharp and/or dull edges. Such processes also involve, for example, cutting, kneading, pounding, impaling, and the like, and combinations thereof.

Nonlimiting examples of chemical modifications include conventional chemical fiber processes such as crosslinking and/or precipitation of complexes thereon. Other examples of suitable modifications of fibers include those found in U.S. Pat. Nos. 6,592,717, 6,592,712, 6,582,557, 6,579,415, 6,579,414, 6,506,282, 6,471,824, 6,361,651, 6,146,494, H1,704, 5,731,080, 5,698,688, 5,698,074, 5,667,637, 5,662,773, 5,531,728, 5,443,899, 5,360,420, 5,266,250, 5,209,953, 5,160,789, 5,049,235, 4,986,882, 4,496,427, 4,431,481, 4,174,417, 4,166,894, 4,075,136, and 4,022,965, the entire contents of each of which are hereby incorporated, independently, by reference. Still other examples of suitable modifications of fibers may be found in U.S. application Ser. No. 60/654,712, filed Feb. 19, 2005, and Ser. No. 11/358,543, filed Feb. 21, 2006, the entire contents of each of which are hereby incorporated, independently, by reference.

The paper substrate may optionally include "fines." "Fines" fibers are typically those fibers with average lengths of not more than about 100 μm. Sources of "fines" may be found in SaveAll fibers, recirculated streams, reject streams, waste fiber streams, and combinations thereof. The amount of "fines" present in the paper substrate can be modified, for example, by tailoring the rate at which streams are added to the paper making process. In one embodiment, the average lengths of the fines are not more than about 5, 10, 15, 20, 25, 30, 35, 40, 45, 50, 55, 60, 65, 70, 75, 80, 85, 90, 95, and 100 μm, including any and all ranges and subranges therein.

If used, the "fines" fibers may be present in the paper substrate together with hardwood fibers, softwood fibers, or both hardwood and softwood fibers.

The paper substrate may optionally contain from 0.01 to 100 wt % fines, based on the total weight of the paper substrate. In one embodiment, the paper substrate may contain from 0.01 to 50 wt % fines, based upon the total weight of the substrate. These ranges include all values and subranges therebetween, including not more than 0.01, 0.05, 0.1, 0.2, 0.5, 1, 2, 3, 4, 5, 6, 7, 8, 9, 10, 12, 15, 20, 25, 30, 35, 40, 45, 50, 55, 60, 65, 70, 75, 80, 85, 90, 95 and 100 wt % fines, based upon the total weight of the paper substrate.

Paper substrates suitable for use herein may have any basis weight. It may have either a high or low basis weight, including basis weights of at least 10 lbs/3000 square foot, preferably from at least 20 to 500 lbs/3000 square foot, more preferably from at least 40 to 325 lbs/3000 square foot. The basis weight may be at least 10, 20, 30, 40, 50, 60, 70, 80, 90, 100, 125, 150, 175, 200, 225, 250, 275, 300, 325, 350, 375, 400, 425, 450, 475, and 500 lbs/3000 square feet, including any and all ranges and subranges therein.

The composition may be added to bleached pulp or paper product at any point in the paper manufacturing process. Some examples of addition points include, but are not limited to (a) to the pulp slurry in the latency chest; (b) to the pulp during or after the bleaching stage in a storage, blending or transfer chest; (c) before the final debleaching stage; (d) to pulp after bleaching, washing and dewatering followed by cylinder or flash drying; (e) before or after the cleaners; (f) before or after the fan pump to the paper machine headbox; (g) to the paper machine white water; (h) sprayed or showered onto the moving wet web after head box forming but before wet press; (i) to the silo or save all; (j) in the press section using, for example, a size press, coater or spray bar; (k) in the drying section using, for example, a size press, coater or spray bar; (l) on the calender using a wafer box; (m) on paper in an off-machine coater or size press; and/or (n) in the curl control unit. Combinations are possible.

The precise location where the composition is added will depend on the specific equipment involved, the exact process conditions being used and the like. These are easily determined given the teachings herein combined with the knowledge of one of ordinary skill in the papermaking art.

Application can be by any means conventionally used in papermaking processes, including by "split-feeding" whereby one or more of the first binder resin, second binder resin, first pigment, and second pigment is/are applied at one point in the papermaking process, for example on pulp or a wet sheet (before the dryers) and the remaining portion of the composition is added at a subsequent point, for example, in the size press.

In one embodiment, all or part of the composition may be added to a bleached pulp or paper product before, after or simultaneously with a sizing composition.

In another embodiment, the composition may be mixed with a surface sizing solution and applied in the size press.

The composition may be applied to the paper substrate at a size press, where any sizing means commonly known in the art of papermaking is acceptable. The size press, for example, may be a puddle mode size press (e.g. inclined, vertical, horizontal) or metered size press (e.g. blade metered, rod metered). In one embodiment, the size press is a metered size press.

In one embodiment, the composition can be applied with conventional size press equipment having vertical, horizontal or inclined size press configurations conventional used in paper preparation as for example the Symsizer (Valmet) type equipment, a KRK size press (Kumagai Riki Kogyo Co., Ltd., Nerima, Tokyo, Japan) by dip coating. The KRK size press is a lab size press that simulates a commercial size press. This size press is normally sheet fed, whereas a commercial size press typically employs a continuous web.

In one embodiment, the temperature at the size press may suitably range from 100-300° F. This range includes all values and subranges therebetween, including 100, 110, 120, 130, 140, 150, 160, 170, 180, 190, 200, 210, 220, 230, 240, 250, 260, 270, 280, 290, and 300° F.

In one embodiment, a rod-metered size press is used. In such an embodiment, a suitable rod volume may range from 0.000864 in$^2$/in to 0.001637 in$^2$/in. This range includes all values and subranges therebetween, including 0.000865, 0.00087, 0.0009, 0.0010, 0.0015, and 0.001637 in$^2$/in.

When the cellulosic fibers are contacted with the composition at the size press, it is preferred that the viscosity of the composition is from 50 to 500 centipoise using a Brookfield Viscometer, number 2 spindle, at 100 rpm and 150° F. These ranges include all values and subranges therebetween, including 50, 55, 60, 65, 70, 75, 80, 85, 90, 95, 100, 125, 150, 160, 170, 180, 190, 200, 210, 220, 230, 240, 250, 260, 270, 280, 290, 300, 325, 350, 375, 400, 425, and 450 centipoise as measured using a Brookfield Viscometer, number 2 spindle, at 100 rpm and 150° F., including any and all ranges and subranges therein. In one embodiment, the viscosity ranges from 50 to 350 centipoise. In another embodiment, the viscosity ranges from 100 to 500 centipoise.

The paper substrate may be pressed in a press section containing one or more nips. Any pressing means commonly known in the art of papermaking may be utilized. The nips may be, but are not limited to, single felted, double felted, roll, and extended nip in the presses. When the sizing solution containing the sizing agent is contacted with the fibers at the size press to make the paper substrate, the effective nip pressure is not particularly limited so long as integrity of the I-beam structure is maintained. For example, the nip pressure may suitably range from greater than zero to 80 kN/m. This range includes all values and subranges therebetween, including greater than zero, 1, 2, 3, 4, 5, 6, 7, 8, 9, 10, 15, 20, 25, 30, 35, 40, 45, 50, 55, 60, 70, and 80 kN/m, including any and all ranges and subranges therein. In one embodiment, the nip pressure ranges from 30 to 80 kN/m.

The nip width is not particularly limited, and may suitably range from greater than zero to 40 mm. This range includes all values and subranges therebetween, including greater than zero, 1, 2, 3, 4, 5, 6, 7, 8, 9, 10, 15, 16, 17, 18, 19, 20, 25, 30, 35, and 40 mm. In one embodiment, the nip width ranges from 15 to 30 mm.

The recording sheet may be dried in a drying section. Any drying means commonly known in the art of papermaking may be utilized. The drying section may include and contain a drying can, cylinder drying, Condebelt drying, IR, or other drying means and mechanisms known in the art. The recording sheet may be dried so as to contain any selected amount of water. Preferably, the recording sheet is dried to contain less than or equal to 10% water.

The recording sheet may be calendered by any commonly known calendaring means in the art of papermaking. More specifically, one could utilize, for example, wet stack calendering, dry stack calendering, steel nip calendaring, hot soft calendaring or extended nip calendering, etc.

The recording sheet may be microfinished according to any process commonly known in the art of papermaking. Microfinishing typically involves frictional processes to finish surfaces of the recording sheet. The recording sheet may be microfinished with or without a calendering applied thereto consecutively and/or simultaneously. Examples of microfinishing processes can be found in U.S. Patent Publication No. 2004/0123966 and references cited therein, as well as U.S. Provisional Patent Application No. 60/810,181 filed Jun. 2, 2006, which are all hereby, in their entirety, herein incorporated by reference.

In one embodiment, the recording sheet comprising the composition and a sizing agent may be further coated by any conventional coating layer application means, including impregnation means. A preferred method of applying the coating layer is with an in-line coating process with one or more stations. The coating stations may be any of known coating means commonly known in the art of papermaking including, for example, brush, rod, air knife, spray, curtain, blade, transfer roll, reverse roll, and/or cast coating means, as well as any combination of the same.

The further coated recording sheet may be dried in a drying section. Any drying means commonly known in the art of papermaking and/or coatings may be utilized. The drying section may include and contain IR, air impingement dryers and/or steam heated drying cans, or other drying means and mechanisms known in the coating art.

The further coated recording sheet may be finished according to any finishing means commonly known in the art of papermaking. Examples of such finishing means, including one or more finishing stations, include gloss calendar, soft nip calendar, and/or extended nip calendar.

These paper substrate and/or recording sheet may be subjected to any conventional papermaking processes, as well as converting processes, including abrading, sanding, slitting, scoring, perforating, sparking, calendaring, sheet finishing, converting, coating, laminating, printing, etc. In one embodiment, the conventional processes include those tailored to produce paper substrates capable to be utilized as coated and/or uncoated paper products, board, and/or substrates. These and other suitable processes may be found in textbooks such as the "Handbook for Pulp and Paper Technologists" by G. A. Smook (1992), Angus Wilde Publications, which is hereby incorporated, in its entirety, by reference.

It may be advantageous that a majority of the total amount of composition is located at or near the outside surface or surfaces (in the case of application to both surfaces) of the paper substrate. In one embodiment, the paper substrate contains the composition such that they (the substrate and the composition) cooperate to form an I-beam structure. I-beam structures are discussed, for example, in U.S. Patent Publication No. 2004/0065423, published Apr. 8, 2004, and in U.S. Provisional Application No. 61/040,806, filed Mar. 31, 2008, the relevant contents of each of which are hereby incorporated by reference. In this regard, it is not required that the composition interpenetrate with the cellulosic fibers of the substrate. However, if the composition and the cellulose fibers interpenetrate, it will create a paper substrate having an interpenetration layer, which is within the ambit of the present invention.

In one embodiment, the interpenetration layer of the paper substrate may define a region in which at least the composition penetrates into and is among the cellulose fibers. The interpenetration layer may be from 1 to 99% of the entire cross section of at least a portion of the paper substrate, including 1, 2, 5, 10, 15, 20, 25, 30, 35, 40, 45, 50, 55, 60, 65, 70, 75, 80, 85, 90, 95, and 99% of the paper substrate, including any and all ranges and subranges therein. Such an embodiment may be made, for example, when the composition is added to the cellulose fibers prior to coating method and may be combined with a subsequent coating method if required. Addition points may be at the size press, for example.

In one embodiment, the cross-sectional thickness of the interpenetration layer may be minimized. Alternatively, or additionally, the concentration of the composition preferably increases as one moves (in the z-direction normal to the plane of the substrate) from the interior portion towards the surface of the paper substrate. Therefore, the amount of composition present towards the top and/or bottom outer surfaces of the substrate may be greater than the amount of composition present towards the inner middle of paper substrate. Alternatively, a majority percentage of the composition may preferably be located at a distance from the outside surface of the substrate that is equal to or less than 25%, more preferably 10%, of the total thickness of the substrate. This aspect may also be known as the $Q_{total}$, which is measured by known methodologies outlined, for example, in U.S. Patent Publication No. 2008/0035292, published Feb. 14, 2008, the entire contents of which are hereby incorporated by reference. If $Q_{total}$ is equal to 0.5, then the composition is approximately evenly distributed throughout the paper substrate. If $Q_{total}$ is greater than 0.5, then there is more sizing agent towards the central portion (measured by the z-direction normal to the plane of the substrate) of the paper substrate than towards the paper substrate's surface or surfaces. If $Q_{total}$ is less than 0.5, then there is less composition towards the central portion of the paper substrate than towards the paper substrate's surface or surfaces. In light of the above, the paper substrate preferably has a $Q_{total}$ that is less total than 0.5, preferably less than 0.4, more preferably less than 0.3, most preferably less than 0.25. Accordingly the $Q_{total}$ of the paper substrate may be from 0 to less than 0.5. This range includes 0, 0.001, 0.002, 0.005, 0.01, 0.02, 0.05, 0.1, 0.15, 0.2, 0.25, 0.3, 0.35, 0.4, 0.45, and 0.49, including any and all ranges and subranges therein.

The recording sheet may be suitably printed by generating images on a surface thereof using conventional printing processes and apparatus as for example laser, ink jet, EP, liquid toner EP, offset, and flexo printing processes and apparatus. In this method, the recording sheet is incorporated into a printing apparatus; and an image is formed on a surface of the sheet. The recording sheet can also be used in any other printing or imaging process, such as printing with pen plotters, printers, copiers, fax machines, and handwriting with ink pens.

The recording sheets desirably exhibit good print density. Print density may be measured using a reflectance densitometer (X-Rite, Macbeth. Etc.) in units of optical density ("OD"). The method involves printing a solid block of color on the sheet, and measuring the optical density. There may be some variation in OD depending on the particular printer used and the print mode chosen, as well as the densitometer mode and color setting. The printer is not particularly limited and may be, for example, an HP Deskjet 5550 printer, an HP Deskjet 6122, manufactured by Hewlett-Packard, which uses a #45 (HP product number 51645A) black ink jet cartridge, or a Canon i470D inkjet printer. The print mode is determined by the type of paper and the print quality selected. The default setting of Plain Paper type and Fast Normal print quality print mode may be suitably selected. A suitable densitometer may be an X-Rite model 528 spectrodensitometer with a 6 mm aperture. The density measurement settings may suitably be Visual color, status T, and absolute density mode. In one embodiment, the target optical density for pigment black ("$OD_O$") is equal to or greater than about 1.30 in the standard (plain paper, normal) print mode for the HP desktop ink jet printers that use the most common black pigment ink (equivalent to the #45 ink jet cartridge). When measured using black pigment ink, this includes all ranges and subranges therebetween, including an $OD_O$ equal to or greater than about 1.30, 1.40, 1.50, 1.60, 1.70, 1.80, and 1.90.

The recording sheets exhibit good toner adhesion. Toner adhesion test measures how well the toner is bonded to the sheet in terms of percent toner retained after a standard peeling force is applied. Poor toner adhesion may results in toner set-off, toner smudging or flaking. The fuser rolls in the copiers or laser printers can become contaminated due to inadequate toner adhesion. To test the toner adhesion, a full circle image of 100% black is printed on a paper sample to be tested using a laser printer, for example HP LaserJet 4050. The optical density value (Before Density) is recorded using a densitometer (X-Rite 418). A 3M Scotch magic Tape 810 is then applied to the image area and a 4.5 lb hand roller is used to apply an appropriate pressure by rolling once on the tape over the image area and the tape is then removed by hand and the optical density (After Density) on the image area is measured after tape removal. The following equation is used to calculate the % toner retained. The higher the % toner retained, the better the toner adhesion. The percent toner retained value is calculated as follows: 100*(After Density−Before Density)/Before Density=% Toner Retained. In one embodiment, the percent toner retained is desirably equal to or greater than about 90%. This range includes all values and subranges therebetween, including equal to or greater than about 90, 91, 92, 93, 94, 95, 96, 97, 98, 99, and 100%.

The recording sheets exhibit good horizontal and/or vertical wicking. The wicking phenomenon results from ink flowing along the length of paper fibers, causing the ink to spread or radiate out from the main body of the printed image. Wicking is generally a print quality attribute used to assess the acceptability of text. The term, "feathering" has been used interchangeably with wicking. A printed image with a wicking problem can cause poor print quality with fuzzy edges or spidery lines. Wicking is determined by printing two parallel solid bars various distances apart on the surface of the paper sample and examining the printed bars under an optical microscope to determine the minimum distances between the printed bars before the edges of the bars begin to touch. The shorter the distance, the better the wicking. Horizontal wicking means wicking along the CD direction; vertical wicking means wicking along the machine direction. In one embodiment, the horizontal and/or vertical wicking values are less than or equal to about 0.40. This range includes all values and subranges therebetween, including less than or equal to about 0.40, 0.35, 0.30, 0.25, 0.20, 0.19, 0.18, 0.17, 0.16, 0.15, 0.14, 0.13, 0.12, 0.11, 0.10, 0.09, 0.08, 0.07, 0.06, 0.05, 0.04, 0.03, 0.02, 0.01, and 0.

The recording sheets exhibit good color-to-color bleed values. Color-to-color bleed is the spread of one color into another color on a paper or a printing media. Color-to-color bleed reduces the resolution of colored text and lines on a colored background. Color-to-color bleed is determined by printing two parallel solid bars of one color (black, blue, green, red) over a primary color background (cyan, magenta, yellow) various distances apart on the surface of the paper sample and examining the printed bars under an optical microscope to determine the minimum distances between the printed bars before the edges of the bars begin to touch. The shorter the distance, the better the color-to-color bleed.

The relevant contents of each of U.S. Provisional Patent Application 60/759,629, filed Jan. 17, 2006; U.S. Provisional Patent Application 60/853,882, filed Oct. 24, 2006; U.S. Provisional Patent Application 60/759,630, filed Jan. 17, 2006; U.S. patent application Ser. No. 10/662,699, filed Sep. 15, 2003, and published Apr. 8, 2004, as U.S. Patent Application Publication No. 2004/0065423; U.S. patent application Ser. No. 11/655,004, filed Jan. 17, 2007, and published Feb. 14, 2008, as U.S. Patent Application Publication No. 2008/0035292 are independently incorporated herein by reference.

The entire contents of "Handbook for Pulp and Paper Technologists" by G. A. Smook (1992) Angus Wilde Publications, is incorporated herein by reference.

As used throughout, ranges are used as a short hand for describing each and every value that is within the range, including all subranges therein.

All of the references, as well as their cited references, cited herein are hereby incorporated by reference with respect to relative portions related to the subject matter of the present invention and all of its embodiments.

EXAMPLES

The present invention may be described in further detail with reference to the following examples. The examples are intended to be illustrative, but the invention is not considered as being limited to the materials, conditions, or process parameters set forth in the examples. All parts and percentages are by unit weight unless otherwise indicated.

Example 1

The following coating formulations were prepared.
Coating 1 (Comparative Example): A coating was prepared using the following materials and instructions:
Structured precipitated calcium carbonate[1]: 60 parts
Kaolin clay[2]: 30 parts
Calcined clay[3]: 5 parts
Plastic pigment[4]: 5 parts
Styrene butadiene acrylic co-polymer[5]: 8 parts
Polyvinyl alcohol[6]: 3 parts
Starch: 3 parts
Lubricant[7]: 1 part
Optical brightening agent[8]: 1 part
  (1) Specialty Minerals Inc. Bethlehem, Pa. 18017
  (2) Imerys, Roswell, Ga. 30076
  (3) Engelhard, Gordon, Ga. 31031
  (4) Dow Chemical Company, Midland, Mich. 48674
  (5) Dow Chemical Company, Midland, Mich. 48674
  (6) Celanese Chemicals, Dallas, Tex. 75234
  (7) Calcium stearate from Omnova Solutions, Inc, Akron, Ohio 44305
  (8) Tinopal OBA from Ciba Specialty Chemicals, Tarrytown, N.Y. 10591

To prepare Coating 1 (Comparative Example), the pigment slurries of structured precipitated calcium carbonate and kaolin clay, calcined clay and plastic pigments are mixed well under high shear. The styrene butadiene acrylic co-polymer latex, polyvinyl alcohol, starch, lubricant and OBA were then added under shear. A blade coater was used to apply coating onto a paper substrate. Both sides of the paper were coated. The coat weight target is 10-15 gsm for the base coat. If Coating 1 is used as the top coat, the target coat weight is 0.5-3 gsm.

Example 2

The following coating formulation was prepared for as the top coat.
Coating 2 (Example of one embodiment of the present invention): A coating was prepared using the following materials and instructions:
Structured precipitated calcium carbonate[1]: 60 parts
Kaolin clay[2]: 30 parts
Calcined clay[3]: 5 parts
Plastic pigment[4]: 5 parts
Styrene butadiene acrylic copolymer[5]: 4 parts
Polyethylene acrylic acid copolymer[6]: 4 parts Polyvinyl alcohol[7]: 3 parts
Starch: 3 parts
Lubricant[8]: 1 part
Optical brightening agent[9]: 1 part (1) Specialty Minerals Inc. Bethlehem, Pa. 18017
(2) Imerys, Roswell, Ga. 30076
(3) Engelhard, Gordon, Ga. 31031
(4) Dow Chemical Company, Midland, Mich. 48674
(5) Dow Chemical Company, Midland, Mich. 48674
(6) Bercen Inc., Cranston, R.I. 02920
(7) Celanese Chemicals, Dallas, Tex. 75234
(8) Calcium stearate from Omnova Solutions, Inc, Akron, Ohio 44305
(9) Tinopal OBA from Ciba Specialty Chemicals, Tarrytown, N.Y. 10591

To prepare Coating 2 (Example of one embodiment of the present invention), the pigment slurries of structured precipitated calcium carbonate and kaolin clay, calcined clay and plastic pigments are mixed well under high shear. The styrene butadiene acrylic co-polymer latex, polyethylene acrylic acid copolymer emulsion, polyvinyl alcohol, starch, lubricant and OBA were then added under shear. A rod coater was used to apply coating onto a paper substrate. Both sides of the paper were coated. The coat weight target is 0.5-3 gsm. The coated paper was calendered using a hot/soft calender to achieve a target gloss of 60% at 75 degrees. The temperature was set at 150 F. The load pressure was set at 100 psi. The calendar speed was set at feet 9 feet per minute.

The papers having Coatings 1 and 2 were subjected to side-by-side comparisons shown in Examples 3-5 below.

Example 3. Toner Adhesion Test Results

TABLE 3-1

Toner adhesion on HP 4050N LaserJet printer:

| Sample | % Toner retained | Rating |
| --- | --- | --- |
| Coating 1 | 99% | Excellent |
| Coating 2 | 94% | Excellent |

TABLE 3-2

Toner adhesion on HP Indigo Digital Press 3000

| Sample | % Toner Retained (15 minutes after printing) | Rating |
| --- | --- | --- |
| Coating 1 | 91% | Good |
| Coating 2 | 99% | Excellent |

The results observed in Table 3-1 show that Coating 2 achieves excellent toner adhesion when used with dry toner. The difference in % toner retention observed for Coatings 1 and 2 in Table 3-1 is not significant. It is both surprising and unexpected that Coating 2 achieves excellent toner retention when used with dry toner.

The results observed in Table 3-2 show that Coating 2 achieves an excellent rating for % toner retention when used in liquid EP printing than Coating 1, which achieves only a good rating. The difference observed in % toner retention observed for Coatings 1 and 2 in Table 3-2 is significant, because the original equipment manufacturer of the printing device can discern the difference. For example, for many applications, an original equipment manufacturer seeking to brand a line of printing paper will not brand a paper having the % toner retention of Coating 1.

Example 4. Inkjet Print Quality Test Results on HP 5550 Deskjet Printer

TABLE 4-1

Print Density (higher value is better)

| Sample | Print Density (Cyan) | Print Density (Magenta) | Print Density (Yellow) | Print Density (Black) | Rating |
| --- | --- | --- | --- | --- | --- |
| Coating 1 | 1.18 | 1.08 | 0.73 | 1.80 | Excellent |
| Coating 2 | 1.17 | 1.08 | 0.74 | 1.82 | Excellent |

TABLE 4-2

Wicking test results: Horizontal wicking (Lower value is better)

| Sample | Wicking - Horizontal (Cyan) | Wicking - Horizontal (Magenta) | Wicking - Horizontal (Yellow) | Wicking - Horizontal (Black) | Rating |
| --- | --- | --- | --- | --- | --- |
| Coating 1 | 0.03 | 0.04 | 0.03 | 0.03 | Excellent |
| Coating 2 | 0.02 | 0.03 | 0.03 | 0.04 | Excellent |

TABLE 4-3

Wicking test results: Vertical wicking (Lower value is better)

| Sample | Wicking - Vertical (Cyan) | Wicking - Vertical (Magenta) | Wicking - Vertical l (Yellow) | Wicking - Vertical (Black) | Rating |
| --- | --- | --- | --- | --- | --- |
| Coating 1 | 0.05 | 0.05 | 0.04 | 0.06 | Excellent |
| Coating 2 | 0.04 | 0.04 | 0.03 | 0.07 | Excellent |

TABLE 4-4

Color-to-color bleed test results (Lower value is better)

| Sample | Bleed - Horizontal (Green-Yellow) | Bleed - Horizontal (Black-Yellow)) | Bleed - Vertical (Green-Yellow) | Bleed - Vertical (Black-Yellow) | Rating |
| --- | --- | --- | --- | --- | --- |
| Coating 1 | 0.10 | 0.03 | 0.10 | 0.06 | Good |
| Coating 2 | 0.07 | 0.03 | 0.11 | 0.06 | Good |

The results observed in Tables 4-1 to 4-4 show that Coating 2 achieves comparable print densities, wicking, and color-to-color bleed values as Coating 1 when used in inkjet printing. The differences in print densities, wicking, and color-to-color bleed values observed for Coatings 1 and 2 in Table 4-1 to 4-4 are not significant. It is both surprising and unexpected, that Coating 2 achieves comparable print densities, wicking, and color-to-color bleed values when used with inkjet printing.

Example 5. Inkjet Print Quality Test Results on Canon i470D Inkjet Printer

TABLE 5-1

Print Density

| Sample | Print Density (Cyan) | Print Density (Magenta) | Print Density (Yellow) | Print Density (Black) | Rating |
|---|---|---|---|---|---|
| Coating 1 | 1.33 | 1.12 | 0.85 | 1.91 | Excellent |
| Coating 2 | 1.34 | 1.13 | 0.86 | 1.92 | Excellent |

TABLE 5-2

Wicking test results: Horizontal wicking (Lower value is better)

| Sample | Wicking - Horizontal (Cyan) | Wicking - Horizontal (Magenta) | Wicking - Horizontal (Yellow) | Wicking - Horizontal (Black) | Rating |
|---|---|---|---|---|---|
| Coating 1 | 0.03 | 0.03 | 0.06 | 0.05 | Excellent |
| Coating 2 | 0.03 | 0.03 | 0.05 | 0.05 | Excellent |

TABLE 5-3

Wicking test results: Vertical wicking (Lower value is better)

| Sample | Wicking - Vertical (Cyan) | Wicking - Vertical (Magenta) | Wicking - Vertical l (Yellow) | Wicking - Vertical (Black) | Rating |
|---|---|---|---|---|---|
| Coating 1 | 0.05 | 0.05 | 0.06 | 0.05 | Excellent |
| Coating 2 | 0.05 | 0.05 | 0.06 | 0.06 | Excellent |

TABLE 5-4

Color-to-color bleed test results (Lower value is better)

| Sample | Bleed - Horizontal (Green-Yellow) | Bleed - Horizontal (Black-Yellow)) | Bleed - Vertical (Green-Yellow) | Bleed - Vertical (Black-Yellow) | Rating |
|---|---|---|---|---|---|
| Coating 1 | 0.17 | 0.05 | 0.35 | 0.04 | Good |
| Coating 2 | 0.24 | 0.04 | 0.31 | 0.06 | Good |

The results observed in Tables 5-1 to 5-4 show that Coating 2 achieves comparable print densities, wicking, and color-to-color bleed values as Coating 1 when used in inkjet printing. The differences in print densities, wicking, and color-to-color bleed values observed for Coatings 1 and 2 in Table 5-1 to 5-4 are not significant. It is both surprising and unexpected, that Coating 2 achieves comparable print densities, wicking, and color-to-color bleed values when used with inkjet printing.

As seen from the examples, the present invention, of which but one embodiment is shown in Coating 2, achieves better % toner retention than a comparative coating (Coating 1) in a liquid EP process but also achieves comparable % toner retention when used in laser (dry toner) and ink jet applications and comparable print densities, wicking, and color-to-color bleed values when used in ink jet applications. This is both surprising and unexpected.

Numerous modifications and variations on the present invention are possible in light of the above teachings. It is, therefore, to be understood that within the scope of the accompanying claims, the invention may be practiced otherwise than as specifically described herein.

What is claimed is:

1. A method for making a recording sheet, said recording sheet, comprising:
   a sizing or coating composition, comprising:
     a first binder resin selected from one or more of a styrene-acrylic acid copolymer, a styrene-butadiene acrylonitrile copolymer, a styrene acrylate latex, an epoxy, a polyvinyl chloride, a polyvinyl acetate, a vinyl acetate acrylate copolymer, or a mixture thereof, and which is compatible with dry toner binder resin;
     a second binder resin selected from one or more of a polyethylene acrylic acid copolymer, a polyethylene methacrylic acid copolymer, or a mixture thereof, and which is compatible with liquid toner binder resin;
     a first pigment, which has a BET surface area of from greater than zero to about 35 $m^2/g$; and
     a second pigment, which has a BET surface area of about 35 $m^2/g$ or greater, and which is different from the first pigment; and
   a paper or plastic substrate in contact with the composition, wherein the sizing or coating composition is comprised within first and second sublayers, the first sublayer being in contact with the paper or plastic substrate and comprising at least one of the first and second binder resins and at least one of the first and second pigments; and
   the second sublayer being in contact with the first sublayer and comprising at least one of the first and second binder resins, wherein the second sublayer is compositionally different from the first sublayer in terms of the presence or absence of one or more of: the first and second binder resins; or the first and second pigments, said method for making the recording sheet comprising contacting, in any order:
     the first binder resin;
     the second binder resin;
     the first pigment;
     the second pigment; or
     a mixture thereof, and
     the paper or plastic substrate,
   to produce the recording sheet.

2. The method of claim 1, wherein the first binder resin is contacted first.

3. The method of claim 1, wherein the second binder resin is contacted first.

4. The method of claim 1, wherein the first pigment is contacted first.

5. The method of claim 1, wherein the second pigment is contacted first.

6. The method of claim 1, wherein a mixture of the first binder resin and first pigment is contacted first.

7. The method of claim 1, wherein a mixture of the first binder resin and second pigment is contacted first.

8. The method of claim 1, wherein a mixture of the second binder resin and first pigment is contacted first.

9. The method of claim 1, wherein a mixture of the second binder resin and second pigment is contacted first.

10. The method of claim 1, wherein a mixture of the first binder resin, the second binder resin and the first pigment is contacted first.

11. The method of claim 1, wherein a mixture of the first binder resin, the second binder resin and the second pigment is contacted first.

12. The method of claim 1, wherein a mixture of the first binder resin, the first pigment and the second pigment is contacted first.

13. The method of claim 1, wherein a mixture of the second binder resin, the first pigment and the second pigment is contacted first.

* * * * *